(12) United States Patent
Abe et al.

(10) Patent No.: US 7,989,027 B2
(45) Date of Patent: Aug. 2, 2011

(54) METAL GASKET MATERIAL PLATE AND METHOD FOR MANUFACTURING THE SAME

(75) Inventors: Tsunehiko Abe, Saitama (JP); Tomokazu Nakanishi, Saitama (JP); Shingo Watanabe, Saitama (JP); Yoshiharu Takada, Kanagawa (JP); Ichiro Goto, Kanagawa (JP); Shinsuke Mochizuki, Saitama (JP); Kenji Okubo, Saitama (JP); Yasuaki Nagai, Saitama (JP)

(73) Assignees: Nippon Leakless Industry Co., Ltd. (JP); Sanshin Industries Co., Ltd. (JP); Honda Motor Co., Ltd. (JP)

( * ) Notice: Subject to any disclaimer, the term of this patent is extended or adjusted under 35 U.S.C. 154(b) by 734 days.

(21) Appl. No.: 11/965,910

(22) Filed: Dec. 28, 2007

(65) Prior Publication Data
US 2008/0211197 A1    Sep. 4, 2008

(30) Foreign Application Priority Data
Dec. 28, 2006    (JP) .................................. 2006-356395

(51) Int. Cl.
*F16J 15/08*    (2006.01)

(52) U.S. Cl. ....................................... 427/301; 428/457
(58) Field of Classification Search .................. 427/301; 428/457
See application file for complete search history.

(56) References Cited

U.S. PATENT DOCUMENTS

| | | | | | |
|---|---|---|---|---|---|
| 4,849,295 | A | * | 7/1989 | Dickerman et al. | 428/457 |
| 4,891,394 | A | * | 1/1990 | Savin | 523/442 |
| 5,130,203 | A | * | 7/1992 | Abe et al. | 428/457 |
| 2003/0214208 | A1 | * | 11/2003 | Nasu et al. | 313/11.5 |

* cited by examiner

*Primary Examiner* — Timothy H Meeks
*Assistant Examiner* — Nathan T Leong
(74) *Attorney, Agent, or Firm* — Mayback & Hoffman, P.A.; Gregory L Mayback; Rebecca A. Tie

(57) ABSTRACT

The present invention is intended to provide a metal gasket material plate with which exfoliation of the coating or blister can be prevented even if it is used in the presence of an electrolyte aqueous solution and which can be manufactured through a process without use of hexavalent chromium in consideration of the environment, etc.

The present, invention relates to a metal gasket material plate comprising a metal plate 1 having a rubber layer 4 on one side or both sides thereof through an adhesive layer 3, wherein a rust-resistant pigment is added to both of said adhesive layer 3 and said rubber layer 4.

6 Claims, 4 Drawing Sheets

(a)

(b)

(a)

(b)

METAL GASKET MATERIAL PLATE AND METHOD FOR MANUFACTURING THE SAME

FIELD OF THE INVENTION

The present invention relates to a metal gasket material plate and a method for manufacturing the same, the metal gasket material plate comprising a metal plate and a rubber layer, which is provided thereon through an adhesive layer. More particularly, the present invention relates to a metal gasket material plate that is suitable for a metal gasket, which is placed inside or around an engine, and relates to a method for manufacturing the same.

BACKGROUND OF THE INVENTION

Recently, laminated-type metal gasket material plates comprising a metal plate and a rubber layer, which is provided thereon through an adhesive layer are widely used as a material for metal gaskets, which is placed around an engine. Sealing of combustion gas, lubricant oil and cooling water in the engine is realized by using a gasket that is made by such metal gasket material plates.

However, with such metal gasket material plates, there exists a problem of exfoliation of the rubber layer. Such exfoliation is likely to occur if water, LLC or electrolyte aqueous solution such as salt water, which is supposed to be sealed in the gasket, permeates the surface of the metal plate and exfoliates the coating and to cause a blister between the metal plate and the adhesive layer or between the adhesive layer and the rubber layer.

Therefore, in the conventional method, to solve the above problem, using an impregnation method, a roll coat method or the like, a coating-type chromate treatment agent containing hexavalent chromium compounds, phosphoric acid and silica is coated on the surface of the metal plate as a surface preparation agent. The coated chromate treatment agent is then dried to form a laminated coat. Since such chromate-based surface preparation provides a specific function of hexavalent chromium that (1) is a barrier effect against corrosive factors, (2) is self-repairable, i.e. ability to repair the defective portion in the coating, and (3) has distinguished interface adherence, adhesiveness between the metal material and the adhesive agent is improved.

However, due to recent environmental concerns, use of the chromate treatment, which utilizes hexavalent chromium (chromium (VI)) compounds), for surface preparation of the metal gasket material is avoided in consideration of industrial waste emission and influences of hexavalent chromium on the environment and the human body.

On the contrary, as for metal plates provided by surface preparation without using hexavalent chromium (meaning that the above advantages (1) to (3) are not realized) but with a coating of a normal rubber layer onto the surface through the intermediary of a normal adhesive layer, permeating of water, LLC or electrolyte aqueous solution such as salt water can occur, and as a result there still remains the problem that exfoliation of the rubber layer is likely to occur by exfoliation of the coating or the blister between the metal plate and the adhesive layer or between the adhesive layer and the rubber layer.

SUMMARY OF THE INVENTION

Thus, the present invention intend to provide a metal gasket material plate and a method of manufacturing the same, with which exfoliation of the coating or blister between the metal plate and the adhesive layer or between the adhesive layer and the rubber layer is prevented even if the metal gasket material plate is used in the presence of water, LLC or electrolyte aqueous solution such as salt water, and which material plate is manufactured through a treatment process without using hexavalent chromium, in consideration of the environment and the human body.

The present invention is made for the purpose of advantageously solving the above problem. The metal gasket material plate according to the present invention is a laminated-type metal gasket material plate comprising a metal plate having a rubber layer on one side or both sides thereof through an adhesive layer, wherein a rust-resistant pigment is added to both of said adhesive layer and said rubber layer. According to need, a top coat material layer may also be provided over said rubber layer for the purpose of preventing blocking and improving slippage performance.

Further, a method of manufacturing a metal gasket material plate according to the present invention comprises steps of coating an adhesive agent containing a rust-resistant pigment in layer on one side or both sides of a metal plate that has been dried out after being subjected an alkaline degreasing treatment, forming an adhesive layer by drying and heating the adhesive agent, coating a rubber material containing a rust-resistant pigment in layer over said adhesive layer, and forming a rubber layer by drying and heating the rubber material. In addition, according to need, the method may also include the steps of coating a top coat material layer over said rubber layer and forming the top coat material layer by drying and heating the top coat material for preventing blocking and improving slippage performance.

According to the present invention of the metal gasket material plate and the method of manufacturing the same, exfoliation of the coating or blister can be prevented even if the metal gasket material plate is used in the presence of an electrolyte aqueous solution, because of the rust-resistant pigment prevents permeation of corrosive factors and a chemical film having high adhesiveness, which is formed as a result of a chemical reaction between the material of the metal plate and a negative ion that gradually dissolved out from the rust-resistant pigment by permeated water, prevents volume expansion (or shrinkage) of the adhesive layer and the rubber layer caused by permeation of the electrolyte aqueous solution. Further, because a surface preparation agent containing hexavalent chromium is not used, the metal gasket material plate can be manufactured through a treatment process without using hexavalent chromium, which is solicitous for the environment and the human body.

The metal gasket material plate of the present invention may also comprise a surface preparation agent layer containing trivalent chromium (chromium (III)), which is provided between said metal plate and said adhesive layer. The surface preparation agent is applied in the present invention for improving corrosion resistance performance of the surface of the material plate and improving adhesiveness between the metal plate and the adhesive layer formed over the metal plate. For this purpose, it is preferable to form a coating having a dry coating weight of 0.1 $g/m^2$ or more and 2 $g/m^2$ or less for one side, by coating a surface preparation agent containing trivalent chromium onto a surface of the metal plate and drying it. More specifically, it is preferable to form a coating, which formed by the surface preparation agent, having a dry coating weight of 0.3 $g/m^2$ or more and 1.5 $g/m^2$ or less for one side of the metal plate.

BRIEF DESCRIPTION OF THE DRAWINGS

FIG. 3(a) is a plan view of an exemplary embodiment of a test piece used in the $N_2$ gas seal performance test according to the invention;

FIG. 3(b) is a cross-sectional view of the test piece of FIG. 3(a) along section line A-A;

FIG. 4(a) is a plan view of an exemplary embodiment of a test piece used in a heat cycle resistance test according to the invention as one evaluation test; and FIG. 4(b) is a fragmentary, cross-sectional view of the test piece of FIG. 4(a) along section line B-B.

Preferred embodiments of the present invention will be described hereinafter in detail. FIG. 1 is a cross-sectional diagram showing an embodiment of the metal gasket material plate of the present invention. FIG. 2 is a side view showing an equipment for carrying out a $N_2$ gas seal performance test as one of the evaluation test.

(Metal Gasket Material Plate)

Figure 1:
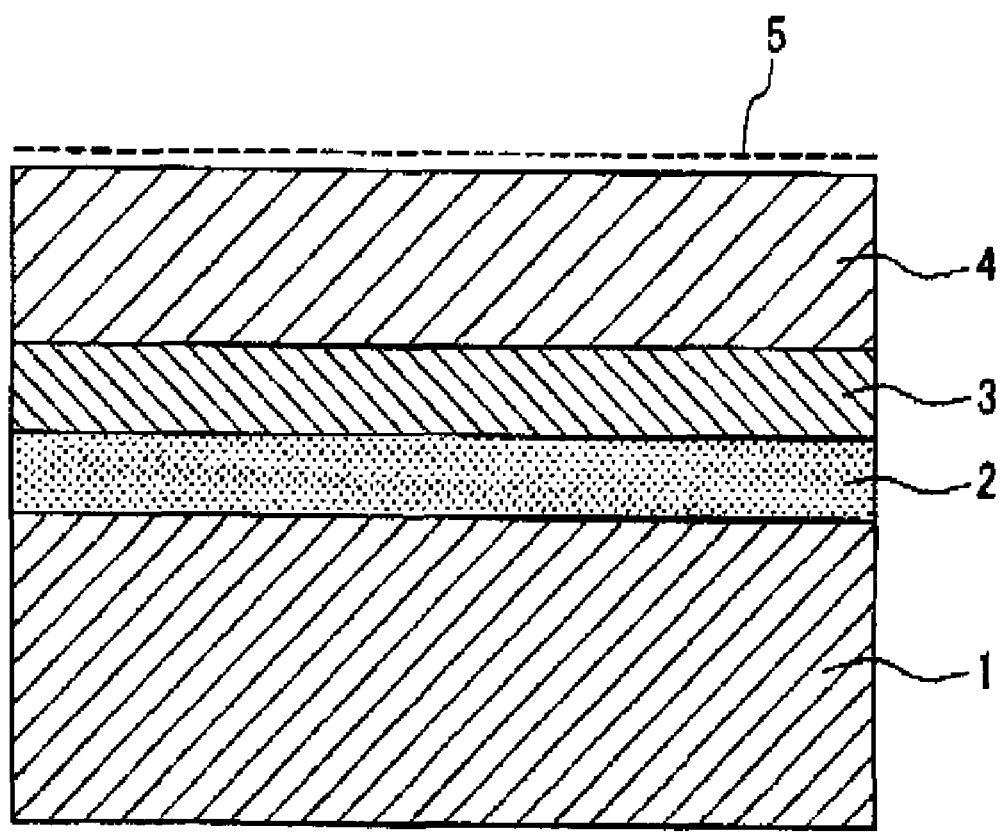
FIG. 1 is a fragmentary, cross-sectional view of an exemplary embodiment of a metal gasket material plate according to the present invention.

According to one embodiment of the metal gasket material plate of the present invention, referring to FIG. 1, a laminated-type metal gasket material plate comprises a metal plate (substrate) 1 having a rubber layer 4 on one side (as shown in FIG. 1) or both sides thereof through an adhesive layer 3, wherein a rust-resistant pigment is added to both of said adhesive layer 3 and the rubber layer 4, and a surface preparation agent layer 2 containing trivalent chromium is provided between the metal plate 1 and the adhesive layer 3. Materials used for the metal gasket material plate in this embodiment will be described hereinafter.

[Metal Plate to be Used]

Any kind of metal plate can be utilized as the metal plate 1, so far as it can be used for a gasket material. For example, it is preferable to use a stainless steel plate, SPCC steel plate (cold-rolled steel plate), a galvanized steel plate, aluminum base alloy plate and the like. Generally, the metal plate as referred to herein is one that has been degreased with an alkaline degreasing agent to remove its oil and fat content as a rolling solution component and other on the surface of the metal plate. The degreasing treatment is a discrete process to trivalent chromium surface preparation process used in the present invention.

[Surface Preparation Agent to be Used (Surface Preparation Agent Containing Trivalent: Chromium)]

A "surface preparation agent containing trivalent chromium" that does not contain hexavalent chromium is used as a surface preparation agent for the surface preparation layer 2. The surface preparation agent is used for the purpose of improving corrosion resistance performance of the surface of the metal plate and also of improving adhesiveness between the adhesive layer formed over the surface preparation agent and the metal plate. For this purpose, it is preferable to form a coating having a dry coating weight of 0.1 g/m$^2$ or more and 2 g/m$^2$ or less for one side by coating a surface preparation agent on a surface of the metal plate 1 and drying it. More specifically, it is preferable to form a coating of the surface preparation agent having a dry coating weight of 0.3 g/m$^2$ or more and 1.5 g/m$^2$ or less for one side of the metal plate.

[Adhesive Agent to be Used]

A phenol resin-based or phenol resin and epoxy resin-based mixed adhesive agent containing at least one of phenol modified epoxy resin, novolac-type phenol resin and resole-type phenol resin is used as the adhesive agent forming the adhesive layer 3. In this case, it is preferable to mix a phenol resin and an epoxy resin at a mix ratio between 10:90 to 90:10. In addition, a tertiary amine compound such as hexamethylenetetramine, an imidazole derivative, a phosphine compound and the like may be added as a hardening accelerator, if needed. Also, a rubber solution, a rubber chemical and an inorganic filler such as carbon black, silica and the like may be added to said adhesive agent, in other words, said adhesive agent may be an adhesive agent containing unvulcanized nitrile rubber or an adhesive agent containing rubber solution obtained by dissolving unvulcanized nitrile rubber in a solvent medium. In this case, it is preferable to use 10 to 200 part by weight (w/t part) of epoxy and phenol resin for 100 w/t part of solution including NBR rubber containing 20 w/t part of nitrile rubber, 60 w/t part of cyclohexanone and 20 w/t part of MEK.

[Rust-Resistant Pigment to be Used for the Adhesive Agent]

A rust-resistant pigment having a particle diameter of 1 μm or more and 50 μm or less is used for the rust-resistant pigment that is to be added to the adhesive agent forming the adhesive layer 3 provided on one side or both sides of the metal plate 1. A rust-resistant pigment being zinc phosphate-based, calcium phosphate-based, magnesium phosphate-based, zinc molybdate-based, calcium molybdate-based, aluminum phosphomolibdate-based, zinc cyan amide-based and the like can be used. The blending quantity of the rust-resistant pigment is 10 or more and 200 or less w/t part of the rust-resistant pigment for 100 w/t part of nonvolatile content of epoxy and phenol resin contained in the adhesive agent. More preferable range of the blending quantity of the rust-resistant pigment is 40 or more and 120 or less w/t part. Further, the thickness of the adhesive layer 3 formed by the adhesive agent is 1 μm or more and 30 μm or less for one side, and more preferably 5 μm or more and 15 μm or less.

[Rubber Material to be Used]

Synthetic rubber such as nitrile rubber (NBR), styrene-butadiene rubber (SBR), fluoro rubber (FKM), acrylic rubber (AR) and silicone rubber, or natural rubber, or mixture of the synthetic rubber and the natural rubber is used for the rubber material used for the rubber layer (rubber compound layer) 4, which contains the rust-resistant pigment, laminated over the adhesive material layer 3. In addition, compounding ingredients that may be added to the rubber layer 4 are, besides the above rubber material, rubber chemicals such as a vulcanizing agent, a vulcanization accelerator and age resistor, and inorganic fillers such as carbon black, white carbon, silica, clay and talc. The blending quantity of each of these inorganic fillers is, preferably, 10 w/t part, or more and 200 w/t part, or less for 100 w/t part of the rubber material.

[Rust-Resistant Pigment to be Used for the Rubber Material]

As the rust-resistant pigment added to the rubber material, which is laminated after the coating of the adhesive agent to form the rubber layer 4, a rust-resistant pigment having a particle diameter of 1 μm or more and 50 μm or less is used, as well as adhesive agent. The rust-resistant pigment being zinc phosphate-based, calcium phosphate-based, magnesium phosphate-based, zinc molybdate-based, calcium molybdate-based, aluminum phosphomolibdate-based, zinc cyanamidebased and the like can be used. The blending quantity of each rust-resistant pigment is 10 w/t part or more and 200 w/t part or less for 100 w/t part of rubber material. A preferable range of the blending quantity of the rust-resistant pigment is 40 w/t part or more and 120 w/t part or less of the rust-resistant pigment. The thickness of the rubber layer (rubber compound layer) 4 containing the rust-resistant pigment and laminated over the adhesive layer 3 is preferably 10 μm or more and 100 μm or less for one side with respect to the thickness of the metal plate 1. The thickness of the rubber layer 4 is, more preferably, 20 μm or more and 50 μm or less.

(Manufacturing Process)

A method of manufacturing the metal gasket material plate according to one embodiment of the present invention comprises following manufacturing steps, the metal gasket material plate being one according to the above embodiment.

(1) Subjecting a metal plate 1 to an alkaline degreasing treatment and drying it.

(2) Subjecting one side or both sides of the metal plate to a surface preparation with a surface preparation agent containing trivalent chromium.

(3) Drying and heating the surface preparation agent to form a surface preparation agent layer 2.

(4) Coating an adhesive agent containing a rust-resistant pigment onto the surface preparation agent layer 2.

(5) Drying and heating the adhesive agent to form an adhesive layer 3.

(6) Coating a rubber material containing a rust-resistant pigment onto the adhesive layer 3.

(7) Drying and heating (vulcanizing) the rubber material to form a rubber layer 4.

(8) According to need, coating a top coat material on the rubber layer 4 and then drying and heating the top coat material to form a top coat material layer 5.

In the above process, a material for the metal gasket is obtained by continuously carrying out adhesive agent treatment, rubber material coating and top coat treatment in a high temperature furnace, for example using a continuous coating method with the use of a roll coater. "Heating" as used herein includes baking, calcining and vulcanizing.

Each of the manufacturing steps will be described hereinafter with respect to the continuous coating method with the use of a roll coater.

[Surface Preparation Step]

Aqueous solution of a surface preparation agent containing trivalent chromium is continuously coated to a coil of a metal plate 1, which surface has been degreased, and water content is dried out through a hot-air dryer, and then a surface preparation agent layer 2 (coating) is formed by baking. The temperature of the hot-air dryer in the drying and baking method is preferably in the range of 150 to 350 degrees C.

[Adhesive Agent Coating Step]

Solution of an adhesive agent containing a rust-resistant pigment which has been dissolved in advance in an organic solvent is coated to one side or both sides, which the surface preparation layer 2 is formed, of the metal plate 1 and the solvent is removed in a baking furnace to form an adhesive layer 3. During the formation of the adhesive layer 3, heating is preferably carried out in the baking furnace at 100 to 350 degrees C. for 0.5 to 10 minutes. With respect to the baking furnace for forming the adhesive layer 3, hot-air drying method, infrared radiation method or far-infrared radiation method is used.

As an organic solvent used in this step, there are cyclohexanone, MEK, toluene, MIBK and xylene, for example, among which cyclohexanone, MEK and toluene are specifically preferable in this embodiment. Also, the organic solvent is used that has most appropriate liquid, retentivity and volatility at the heating and baking of the solvent. For example, in consideration of viscosity, fluidity and volatility at which the coating solution is coatable with a roll coater, the quantity of the solvent to be added is controlled and the solvent is selected so that cyclic usage of the coating material with the use of a pump is possible.

[Rubber Material Coating Step]

A solution of rubber material containing a rust-resistant pigment, which has been dissolved in advance in an organic solvent, is coated to one side or both sides, which the adhesive layer 3 is formed, of the metal plate 1, and then the solvent is removed through a baking furnace to form a rubber layer 4. During the formation of the rubber layer 4, heat is preferably applied at 100 to 350 degrees C. for 0.5 to 10 minutes in the baking furnace. In this way, a material for the gasket according to the present embodiment is basically manufactured.

As the organic solvent used for the step of forming the rubber layer 4, there are cyclohexanone, MEK, toluene, MIBK and xylene, for example, among which cyclohexanone, MEK and toluene are specifically preferable in this embodiment. Also, in this step, an organic solvent is used that has most appropriate liquid retentivity and volatility at the heating and baking of the solvent. For example, in consideration of viscosity, fluidity and volatility at which the coating solution is coatable with a roll coater, the quantity of the solvent to be added is controlled and the solvent is selected so that cyclic usage of the coating material with the use of a pump is possible. With respect to the baking furnace for forming the rubber layer 4, hot-air drying method, infrared radiation method or far-infrared radiation method is used.

[Top Coat Coating Step]

In this embodiment, a top coat layer 5 is formed over the rubber layer 4, if needed. With respect to the material used for the top coat layer 5, there is no essential material, thus, the composition, and the amount of coating and the method of coating may be determined according to purposes, for example prevention of blocking or improvement of wear resistance through improvement of slippage performance.

By continuously coating the layers in this way, high productivity can be achieved and the material for the gasket obtained is provided with advantageous characteristics.

EXAMPLES

Embodiments of the present invention will be described hereinafter in detail with reference to practical examples. Gasket material plates of examples 1-4 and comparative examples 1-4 were made from gasket material compositions described in the upper column and the middle column of following Table 1 according to below procedure, and then evaluations of material characteristics of the gasket material plates were made.

| | Example 1 (PHR) | Example 2 (PHR) | Example 3 (PHR) | Example 4 (PHR) | Comparative example 1 (PHR) | Comparative example 2 (PHR) | Comparative example 3 (PHR) | Comparative example 4 (PHR) |
|---|---|---|---|---|---|---|---|---|
| Adhesive agent composition | | | | | | | | |
| Epoxy resin | 100 | 100 | 100 | 100 | 100 | 100 | 100 | 100 |
| Phenol resin | 15 | 15 | 15 | 15 | 15 | 15 | 15 | 15 |
| Nitrile rubber solution (20% rubber content) | 300 | 300 | 300 | 300 | 300 | 300 | 300 | 300 |
| Hardening accelerator | 2 | 2 | 2 | 2 | 2 | 2 | 2 | 2 |
| Rust-resistant pigment (zinc phosphate) | 100 | 100 | 100 | | | 100 | 200 | 100 |
| Rust-resistant pigment (aluminum phosphomolybdate) | | | | 100 | | | | |
| Rubber vulcanizate composition | | | | | | | | |
| Nitrile rubber | 100 | 100 | 100 | 100 | 100 | 100 | 100 | 100 |
| Carbon black | 60 | 60 | 60 | 60 | 60 | 60 | 60 | 60 |
| Sulfur | 1 | 1 | 1 | 1 | 1 | 1 | 1 | 1 |
| Vulcanization auxiliary agent | 5 | 5 | 5 | 5 | 5 | 5 | 5 | 5 |
| Vulcanization accelerator | 5 | 5 | 5 | 5 | 5 | 5 | 5 | 5 |
| Age resistor | 3 | 3 | 3 | 3 | 3 | 3 | 3 | 3 |
| Stearic acid | 2 | 2 | 2 | 2 | 2 | 2 | 2 | 2 |
| Plasticizer | 10 | 10 | 10 | 10 | 10 | 10 | 10 | 10 |
| Rust-resistant pigment (zinc phosphate) | 40 | 80 | 160 | | | | | |
| Rust-resistant pigment (aluminum phosphomolybdate) | | | | 80 | | | | |
| Material characteristic evaluation | | | | | | | | |
| $N_2$ gas seal performance | ○ | ○ | □ | ○ | ○ | ○ | ○ | x |
| Heat cycle resistance | □ | ○ | ○ | ○ | x | x | x | □ |
| Antifreezing solution souse resistance | ○ | ○ | ○ | ○ | x | ○ | ○ | ○ |
| Oil souse resistance | ○ | ○ | ○ | ○ | ○ | ○ | ○ | ○ |
| Fuel oil souse resistance | ○ | ○ | ○ | ○ | ○ | ○ | ○ | ○ |
| Heat aging resistance | ○ | ○ | ○ | ○ | ○ | ○ | ○ | ○ |
| Salt water resistance | ○ | ○ | ○ | ○ | x | x | x | x |

[Surface Preparation Treatment]

After the surface of a SUS 301 steel plate having 0.2 mm thickness was degreased with an alkaline cleaner, aqueous solution of a surface preparation treatment agent comprising trivalent chromium was coated to both sides of the steel plate using a roll coater with approximately 0.3 to 1.5 g/m² application quantity for one side. Then, the base coat treatment material, was dried and baked to form a coating.

[Preparation of an Adhesive Agent Solution with a Rust-Resistant Pigment Added and Blended]

A solution containing nitrile rubber (20%) having a composition of 20 w/t part of nitrile rubber, 60 w/t part of cyclohexanone and 20 w/t part of methyl ethyl ketone, a hardening accelerator and a rust-resistant pigment was added to and blended in with solution of a phenol/epoxy resin mixed-type adhesive agent to obtain an adhesive agent containing a rust-resistant pigment,

[Coating of the Adhesive Agent]

A solution of the phenol/epoxy resin mixed-type adhesive agent containing a rust-resistant pigment described in Table 1 was coated onto both sides of the formed coating with 5 to 15 μm thickness for one side, using a roll coater. Drying and baking of the solvent was continuously carried out in a furnace at 200 to 300 degrees C. for 2 to 5 minutes to form an adhesive agent layer.

[Preparation of a Uniform Solution of a Rubber Compound with Rust-Resistant Pigment Added and Blended]

Preparation of a uniform solution of a rubber compound was made in a following way. First, as described in Table 1, nitrile rubber (NBR), carbon black, zinc oxide, sulfur, vulcanization accelerator, age resistor, stearic acid and plasticizer were mixed and kneaded uniformly using a roll. Then the kneaded material was dissolved by added cyclohexanone, MEK and toluene to obtain an NBR rubber solution. A rust-resistant pigment was added to the prepared NBR rubber solution and mixed to obtain a rubber solution containing a rust-resistant pigment.

[Coating of a Rubber Layer]

The above-described uniform solution of a rubber compound described in Table 1, which was obtained by controlling the viscosity of a rubber compound containing a rust-resistant pigment in advance with the use of cyclohexanone, methyl ethyl ketone (MEK), toluene, and the like, was coated onto both sides of the adhesive layer with approximately 1.0 to 30 μm thickness for one side, using a roll coater. Drying of the solvent and vulcanization were carried out continuously in a furnace at 150 to 250 degrees C. for a few minutes.

[Coating of a Top Coat Layer]

A top coat layer was formed over the rubber vulcanization layer. With regard to the coating method in this case, a water dispersible wax was coated by approximately 100 to 1500 mg/m² for one side, using a roll coater. The coated wax was dried at 100 to 200 degrees C. to form a coating,

[Contents and Criteria of Evaluation]

Figure 2:
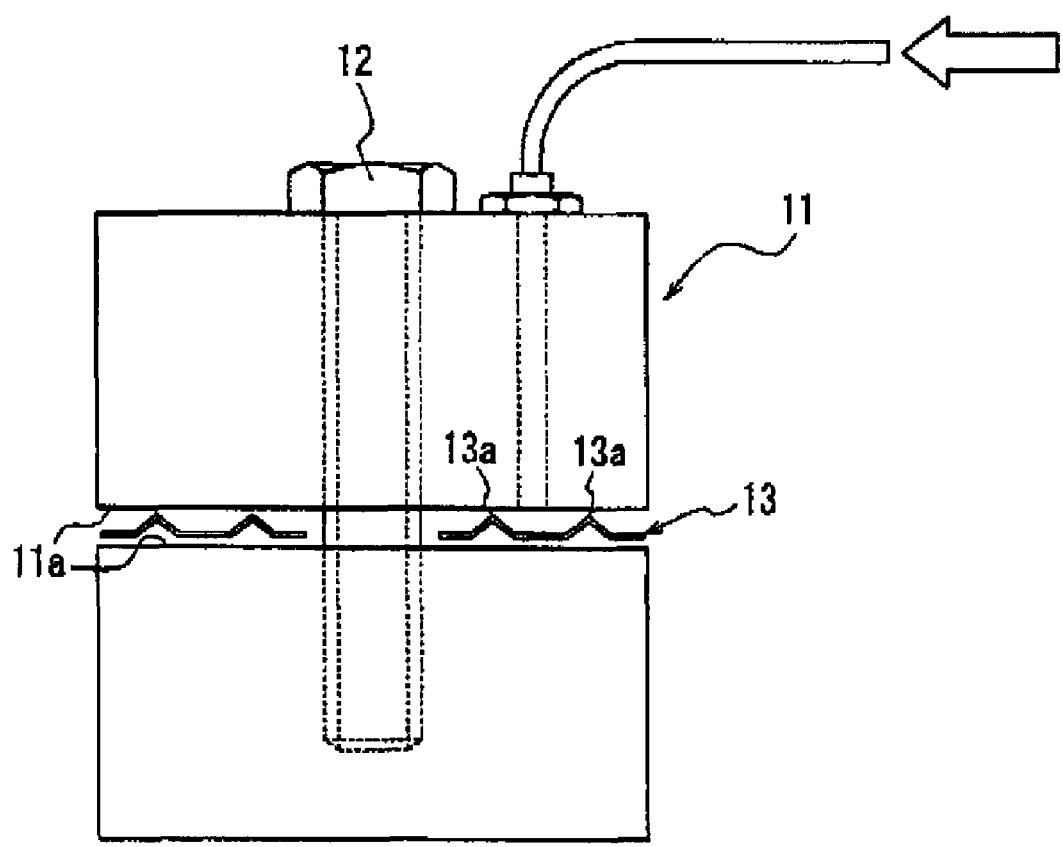
FIG. 2 is a fragmentary, side elevational view of an exemplary embodiment of equipment for carrying out a $N_2$ gas seal performance test according to the invention as one evaluation test.
Figure 3:
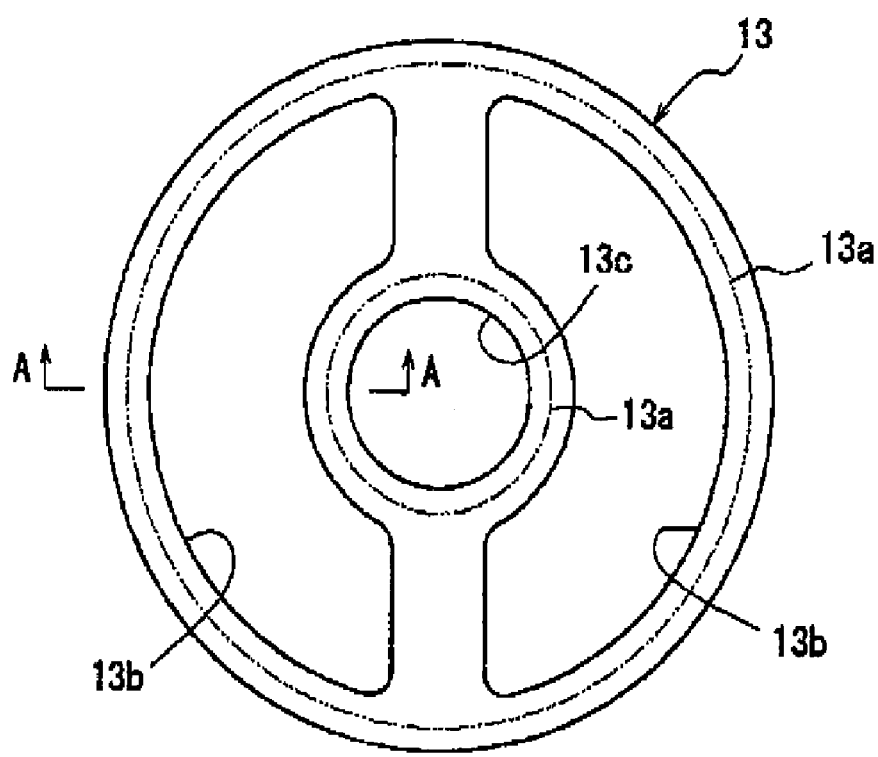
FIGS. 3 (a) and (b) are a plan view showing a form of a test piece used in the $N_2$ gas seal performance test and a cross-sectional diagram along a line A-A in the plan view, respectively.
Figure 3:
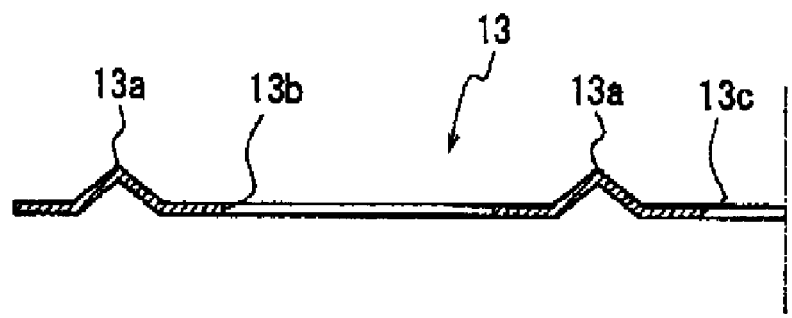

Evaluations of the metal gasket material plate comprising the layers, which laminated in the above-described way, were made with respect to following material characteristics, (1) $N_2$ Gas Seal Performance A test piece 13 having been punched out in a predefined test shape shown in FIGS. 3 (a) and (b) was placed between sample nipping surfaces 11a, which plane roughness are 12.5 S, of an aluminum jig 11 shown in FIG. 2. A fastening bolt 12 was tightened with 500 to 1500 N cm torque to fasten and pinch the test piece 13. Then, the seal limit pressure was evaluated by supplying $N_2$ gas to the test piece 13 as shown by an arrow. The test piece 13 has mound-shaped beads (so-called full beads) 13a in shapes of double circles, openings 13b in shapes of circular arc located between these mound-shaped beads 13a and an opening 13c in a shape of a circle surrounded by the inner side mound-shaped bead 13a. $N_2$ gas was supplied between the mound-shaped beads 13a in shapes of double circles.

(Evaluation Criteria)

○ Suitable for gasket material

☐ There is possibility of causing practical problems when used as gasket material x Not suitable for use in gasket material.

(2) Heat Cycle Resistance

Figure 4:
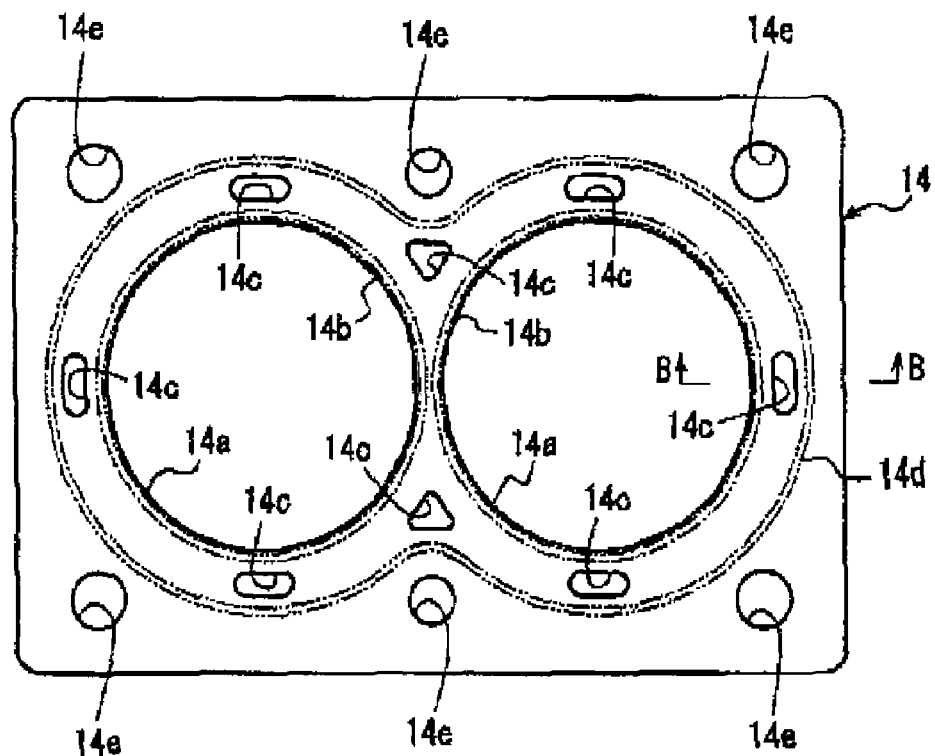
FIGS. 4 (a) and (b) are a plan view showing a form of a test piece used in a heat cycle resistance test as one of the evaluation test and a cross-sectional diagram along a line B-B in the plan view, respectively.
Figure 4:
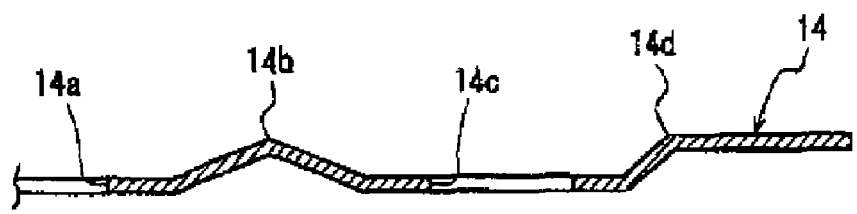

A test piece 14 shown in FIGS. 4 (a) and (b), having been punched out in a predefined shape of a cylinder-head gasket, comprises two cylinder bore holes 14a, two mound-shaped beads 14b in shapes of circles each surrounding the cylinder bore holes 14a, a plurality of passage holes 14c for cooling water and water vapor, a step bead (so-called half bead) 14d wholly surrounding the passage holes 14c and a plurality of fastening bolt-holes 14e located between the step bead 14d and the periphery of the test piece 14. The test piece 14 is placed between a cylinder block and a cylinder head, which are not shown in the drawing. With fastening bolts, for fastening the cylinder block and the cylinder head, being fastened through the above-mentioned fastening bolt-holes He with 100 N m torque fastening pressure, cooling water and water vapor introduced from a boiler are alternately and repeatedly supplied to the passage holes 14c 500 times, each cycle lasting for five minutes Then, conditions of the coating at the water vapor passage portion pinched between the mound-shaped beads 14b, which surround the cylinder bores 14a, and the step bead 14d is checked with eyes, i.e., visually.

(Evaluation Criteria)

○ No blister or exfoliation is observed. Suitable for gasket material.

☐ Partial blister or exfoliation is observed. There is possibility of causing practical problems, x Blister or exfoliation is observed in 30% or more area. Not suitable for gasket material (3) Antifreezing Solution Resistance Test Genuine 100% LLC liquid for Honda two-wheeled vehicles is filled in a vessel so that the test piece can be soused. The test, piece is soused in the LLC liquid at 100 degrees C. for 120 hours and then drawn out. The external appearance of the liquid-contacted portion is evaluated with eyes.

(Evaluation Criteria)

○ No blister or exfoliation is observed. Suitable for gasket material.

☐ Partial blister or exfoliation is observed. There is possibility of causing practical problems.

x Blister or exfoliation is observed in 30% or more of the whole area. Not suitable for gasket material, (4) Oil Souse Resistance Test Genuine 100% oil 10W-30 for Honda two-wheeled vehicles is filled in a vessel so that the test piece can be soused. The test piece is soused at 150 degrees C. for 120 hours and then drawn out. The external appearance of the liquid-contacted portion is evaluated with eyes, ○ No blister or exfoliation is observed. Suitable for gasket material.

☐ Partial blister or exfoliation is observed. There is possibility of causing practical problems.

x Blister or exfoliation is observed in 30% or more of the whole area. Not suitable for gasket material.

(5) Fuel Oil Souse Resistance Test

ASTM FUEL C is filled in a vessel so that the test piece can be soused. The test piece is soused at room temperature for 120 hours and then drawn out. The external appearance of the liquid-contacted portion is evaluated with eyes.

○ No blister or exfoliation is observed. Suitable for gasket material.

☐ Partial blister or exfoliation is observed. There is possibility of causing practical problems.

x Blister or exfoliation is observed in 30% or more of the whole area. Not suitable for gasket material, (6) Heat Aging Resistance A cross-cut adhesion test is carried out based on JIS K 5600 with respect to a material having been heated in an air circulation heating furnace at 200 degrees C. for 72 hours and, then, the number of exfoliations remained on an adhesive tape is counted.

(Evaluation Criteria)

○ No exfoliation is observed. Suitable for gasket material.

☐ Partial exfoliation is observed. There is possibility of causing practical problems.

x Exfoliation is observed in 30% or more of the whole area. Not suitable for gasket material.

(7) Salt Water Resistance Test

A test piece similar to one shown in FIG. 3 is pinched in a jig, which is similar to one shown in FIG. 2, the jig being shaped so as to allow water into circulate. Salt water having been heated to 60 to 95 degrees C with a heater is circulated in the jig using a pump and then conditions of the coating at the salt water passage portion of the test piece located between the mound-shaped beads is checked with eyes.

○ No blister or exfoliation is observed. Suitable for gasket material.

☐ Partial blister or exfoliation is observed. There is possibility of causing practical problems.

x Blister or exfoliation is observed in 30% or more. Not suitable for gasket material.

A summary of results of the above-described evaluations is reported in the bottom column of Table 1. Details of the results of the evaluations will be described hereinafter.

Example 1

100 w/t. part of rust-resistant pigment (zinc phosphate) was added for 100 w/t part of epoxy resin contained in the adhesive agent and 40 w/t part of rust-resistant pigment (zinc phosphate) was added for 100 w/t part of rubber content in the rubber vulcanizate. Good results were obtained with respect to the evaluations for $N_2$ seal performance, antifreezing solution souse resistance, oil souse resistance, fuel oil souse resistance, heat aging resistance and salt water resistance. However, slight blister and exfoliation occurred in the heat cycle resistance test.

Example 2

100 w/t part of rust-resistant pigment (zinc phosphate) was added for 100 w/t part of epoxy resin contained in the adhesive agent and 80 w/t part of rust-resistant pigment (zinc phosphate) was added for 100 w/t part of rubber content in the rubber vulcanizate. Good results were obtained with respect to the evaluations for $N_2$ seal performance, heat cycle resistance, antifreezing solution souse resistance, oil souse resistance, fuel oil souse resistance, heat aging resistance and salt water resistance, and suitability for gasket material is exhibited.

Example 3

100 w/t part of rust-resistant pigment (zinc phosphate) was added for 100 w/t part of epoxy resin contained in the adhesive agent and 160 w/t part of rust-resistant pigment (zinc phosphate) was added for 100 w/t part of rubber content in the rubber vulcanizate. Good results were obtained with respect to the evaluations for heat cycle resistance, antifreezing liquid souse resistance, oil souse resistance, fuel oil souse resistance, heat aging resistance and salt water resistance. However, there was observed slight possibility of causing trouble for gasket material with respect to $N_2$ seal performance.

Example 4

100 w/t part of rust-resistant pigment (aluminum phosphomolybdate) was added for 100 w/t part of epoxy resin contained in the adhesive agent and 80 w/t part of rust-resistant pigment (aluminum phosphomolybdate) was added for 100 w/t part of rubber content in the rubber vulcanizate. Similar to the case of the test piece containing zinc phosphate (Example 2), good results were obtained with respect to the evaluations for $N_2$ seal performance, heat cycle resistance, antifreezing liquid souse resistance, oil souse resistance, fuel oil souse resistance, heat aging resistance and salt water resistance, and suitability for gasket material is exhibited, Comparative Example 1

No rust-resistant pigment was added to the adhesive agent and the rubber vulcanizate. Although good results were obtained with respect to the evaluations for $N_2$ seal performance, oil souse resistance, fuel oil souse resistance and heat aging resistance, blister and exfoliation occurred in 30% or more of the whole area with respect to heat cycle resistance test, antifreezing liquid souse resistance test and salt water resistance test. Thus comparative example 1 was not desirable for gasket material.

Comparative example 2

100 w/t part of rust-resistant pigment (zinc phosphate) was added only for 100 w/t part of epoxy resin contained in the adhesive agent. Good results were obtained with respect to the evaluations for $N_2$ seal performance, antifreezing liquid souse resistance, oil souse resistance, fuel oil souse resistance and heat aging resistance. However, exfoliation occurred in 30% or more of the whole area in the heat cycle resistance test and the salt water resistance test. Thus, comparative example 2 was not desirable for gasket material.

Comparative Example 3

200 w/t part of rust-resistant pigment (zinc phosphate) was added only for 100 weight parts epoxy resin contained in the adhesive agent Good results were obtained with respect to the evaluations for $N_2$ seal performance, antifreezing liquid souse resistance, oil souse resistance, fuel oil souse resistance and heat aging resistance. However, exfoliation occurred in 30% or more of the whole area in the heat cycle resistance test and the salt water resistance test. Thus, comparative example 3 was not desirable for gasket material.

Comparative Example 4

100 w/t part of rust-resistant pigment (zinc phosphate) was added only for 100 w/t part of epoxy resin contained in the adhesive agent. As for the rubber vulcanizate, 80 w/t part of carbon, instead of the rust-resistant pigment, was added for 100 w/t part of rubber content (140 w/t part in total). Good results were obtained with respect to the evaluations for antifreezing liquid souse resistance, oil souse resistance, fuel oil souse resistance and heat aging resistance. However, results of the $N_2$ seal performance test, the heat cycle resistance test and the salt water resistance test were not desirable for gasket material.

As described above, the gasket material plates of the above examples 1-4 exhibit high performance for gasket material, different from the above comparative examples 1-4. In particular, it was confirmed that, with the gasket material plates of the examples 1-4, exfoliation of the coating or blister could be prevented if they are used in the presence of an electrolyte aqueous solution. Further, because no surface preparation agent containing hexavalent chromium is used in the gasket material plate of the above examples 1-4, the metal gasket material plates can be manufactured through a process without use of hexavalent chromium, which is good for the environment, etc.

Although the present invention has been described above based on the illustrated examples, the present invention is not limited thereto and modifications are possible within the scope of the claims. For example, while a surface preparation agent layer containing trivalent chromium and an adhesive layer, a rubber layer and a top coat layer, each of which contains a rust-resistant pigment, are provided to the both surfaces of the metal plate in the above examples, it is also possible to provide these layers on only one side of the metal plate or to dispense with the top coat layer, according to need.

INDUSTRIAL APPLICABILITY

Thus, with the metal gasket material plate and the method for manufacturing the same according to the present invention, it is possible to prevent exfoliation of the coating or blister even if the metal gasket material plate is used in the presence of an electrolyte aqueous solution, since the rust-resistant pigment prevents permeation of corrosive factors, and also negative ions, which gradually dissolved out from the rust-resistant pigment by permeated water, react with the material of the metal plate to form a chemical coating with high adhesiveness, preventing volume expansion (or shrinkage) of the adhesive material layer and the rubber layer due to the permeation of the electrolyte aqueous solution. Further, since no surface preparation agent containing hexavalent chromium is used, the metal gasket material plate can be manufactured through a process without use of hexavalent chromium, which is good for the environment, etc.

We claim:

1. A method for manufacturing a metal gasket material plate, which comprises:
   providing an alkaline-degreased and dried metal plate;
   coating at least one side of the plate with a layer of a surface preparation agent free from hexavalent chromium;
   forming a surface preparation material layer by drying and heating the surface preparation agent;
   coating a layer of an adhesive agent containing a rust-resistant pigment over said surface preparation material layer;
   forming an adhesive layer by drying and heating the adhesive agent;
   coating a layer of a rubber material containing a rust-resistant pigment over said adhesive layer; and
   forming a rubber layer by drying and heating the rubber material.

2. The method according to claim 1, wherein:
   said surface preparation agent contains trivalent chromium.

3. The method according to claim 2, which further comprises:
   coating a top coat material over the rubber layer; and
   forming a top coat material layer by drying and heating the top coat material.

4. The method according to claim 1, wherein said rust-resistant pigments have a particle diameter between approximately 1 μm and 50 μm.

5. The method according to claim 2, wherein said rust-resistant pigment contained in said adhesive agent is between 10 and 200 parts by weight for 100 parts by weight of non-volatile content of epoxy and phenol resin contained in said adhesive agent.

6. The method according to claim 1 or 5, wherein said rust-resistant pigment contained in said rubber material is between 10 and 200 parts by weight for 100 parts by weight of rubber material.

* * * * *